(12) United States Patent
Voetmann et al.

(10) Patent No.: US 11,390,225 B2
(45) Date of Patent: Jul. 19, 2022

(54) REAR CORNER ELEMENT

(71) Applicant: MOUNTAIN TOP INDUSTRIES APS, Frederikssund (DK)

(72) Inventors: Thomas Rendbeck Voetmann, Jyllinge (DK); Peter Singer Hansen, Fredensborg (DK); Feigler Szabolcs, Copenhagen (DK)

(73) Assignee: MOUNTAIN TOP INDUSTRIES APS, Frederikssund (DK)

( * ) Notice: Subject to any disclaimer, the term of this patent is extended or adjusted under 35 U.S.C. 154(b) by 0 days.

(21) Appl. No.: 17/611,508

(22) PCT Filed: May 12, 2020

(86) PCT No.: PCT/EP2020/063151
§ 371 (c)(1),
(2) Date: Nov. 15, 2021

(87) PCT Pub. No.: WO2020/229450
PCT Pub. Date: Nov. 19, 2020

(65) Prior Publication Data
US 2022/0144188 A1    May 12, 2022

(30) Foreign Application Priority Data

May 16, 2019 (DK) .......................... PA 2019 70311
Aug. 30, 2019 (DK) .......................... PA 2019 70541

(51) Int. Cl.
*B60R 13/07* (2006.01)
*B60J 7/06* (2006.01)
*B60J 7/04* (2006.01)

(52) U.S. Cl.
CPC ............... *B60R 13/07* (2013.01); *B60J 7/068* (2013.01); *B60J 7/041* (2013.01); *B60J 7/062* (2013.01)

(58) Field of Classification Search
CPC ......... B60R 13/07; B60R 7/062; B60R 7/068; B60R 7/041; B60J 7/062; B60J 7/068; B60J 7/041
(Continued)

(56) References Cited

U.S. PATENT DOCUMENTS 5,186,514 A    2/1993  Ronai
6,030,021 A    2/2000  Ronai
(Continued)

FOREIGN PATENT DOCUMENTS

JP    2018-52410 A    4/2018
WO   2010/103200 A2   9/2010

*Primary Examiner* — Jason S Morrow
(74) *Attorney, Agent, or Firm* — Fox Rothschild LLP

(57) ABSTRACT

A rear corner element for a truck bed cover serve to guide rainwater exterior to the truck bed wall. The rear corner element has a mounting part and a cover part. The mounting part has a base mounting part adapted for being secured on top of the rear end of a side wall of the truck bed in elongated of a coupling rail adapted for mounting a roll-up truck bed cover to said side wall of the truck bed, a first front end part configured to be assembled to a free rear end of the coupling rail in lengthwise extension of said coupling rail, a first rear end part opposite the first front end part, and at least one rainwater diverting channel and/or chamber extending lengthwise of the mounting part from the rainwater inlet to the first rear end part.

13 Claims, 15 Drawing Sheets

(58) Field of Classification Search
USPC .................................. 296/100.17, 100.18
See application file for complete search history.

(56) References Cited

U.S. PATENT DOCUMENTS

| | | | | |
|---|---|---|---|---|
| 6,126,226 | A | 10/2000 | Wheatley | |
| 6,257,306 | B1* | 7/2001 | Weldy | B60J 7/104 |
| | | | | 296/100.18 |
| 6,257,647 | B1* | 7/2001 | Ninness | B60J 7/102 |
| | | | | 296/100.18 |
| 8,702,151 | B2* | 4/2014 | Mayfield | B60J 7/102 |
| | | | | 296/100.18 |
| 9,981,537 | B2* | 5/2018 | Xu | B60J 7/104 |
| 10,538,150 | B2* | 1/2020 | Zichettello | B60J 7/068 |
| 11,046,157 | B2* | 6/2021 | Rørvig | B60J 7/041 |
| 2007/0035151 | A1 | 2/2007 | Rusu | |
| 2015/0274259 | A1 | 10/2015 | Ziethe et al. | |
| 2018/0281572 | A1 | 10/2018 | Zichettello et al. | |

* cited by examiner

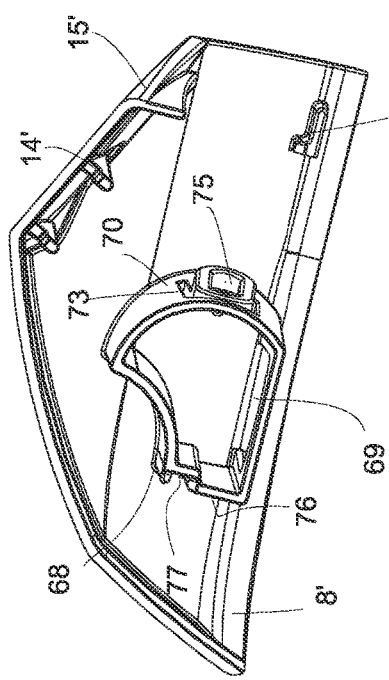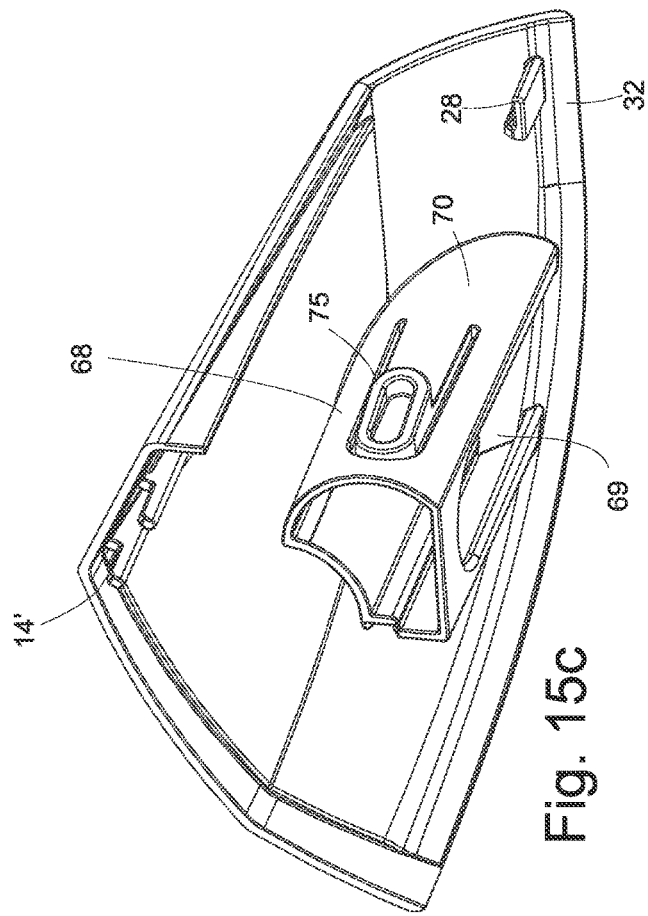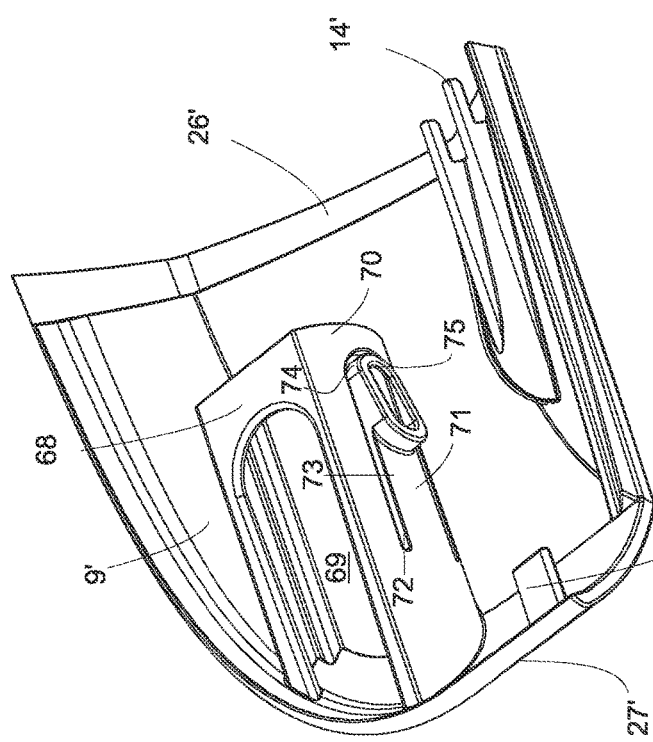

REAR CORNER ELEMENT

CROSS REFERENCE TO RELATED APPLICATIONS

This application is a 371 filing of International Patent Application PCT/EP2020/063151 filed May 12, 2020, which claims the benefit of priority to Danish patent application no. PA 2019 70311 filed May 16, 2019 and Danish patent application no. PA 2019 70541 filed Aug. 30, 2019, the disclosures of which are hereby incorporated by reference herein.

TECHNICAL FIELD

The present invention relates to a rear corner element for a truck bed cover.

The present invention relates in particular to a drainage system for truck bed covers, especially truck bed covers composed of interconnected rigid slats.

BACKGROUND

When a truck bed is open and the truck bed cover more or less retracted and rolled-up, rainwater gets inside the truck bed. When the truck bed cover is closed rainwater gather on top of it so that when the truck bed cover is rolled-up the rainwater can get inside the truck bed, and inside the canister that houses the rolled-up truck bed cover, which typically is provided in proximity of the driver's cab.

Drain holes may be premade in some truck beds to drain water from the truck bed, but a truck bed cover is often not part of the truck bed from the start. Truck bed covers are very often obtained as an aftermarket product and installed after purchase. Premade drain holes may not suffice and be in an inappropriate location to drain water accumulated by the truck bed cover. The most frequently used solution is to drill appropriately located drain holes that properly guide the rainwater out of the truck bed, including out of the canister and of the coupling rails.

Drain holes can e.g. be premade or drilled through the side of the truck bed, at the bottom of the truck bed, at the tailgate and/or at the front end, or in the canister. Drain tubes can be used to achieve fluid communication and guide water to the drain holes.

Drilling drain holes in a truck bed permanently alters and may even damage the truck and is therefore undesirable, and connecting tubes to drain hole may be challenging. If an existing truck bed cover is to be replaced with a new one, new holes must often be drilled.

Truck bed cover manufacturers are therefore constantly looking for solutions to minimize the above disadvantages and problems of diverting rain from the prior art truck bed covers and truck beds.

SUMMARY OF THE INVENTION

In a main aspect of the present invention is provided a rear corner element of the kind mentioned in the opening paragraph, which rear corner element guides rainwater out along the exterior face at the rear end of the truck bed,—thus at the tailgate.

In yet an aspect of the present invention is provided a drainage system for a truck bed provided with a roll-up truck bed cover assembled of rigid slats, which drainage system reduces the need for drilling drain holes and using drain tubes.

In yet an aspect of the present invention is provided a rear corner element of the kind mentioned in the opening paragraph, which rear corner element is easy to install and has high vehicle compatibility.

In yet an aspect of the present invention is provided a rear corner element that facilitates mounting and dismounting of the truck bed cover from the coupling rails.

The novel and unique features whereby these and other aspects are achieved according to the present invention consist in that the rear corner element has a mounting part and a cover part, wherein the mounting part has a base mounting part adapted for being secured on top of the rear end of a side wall of the truck bed in elongation of a coupling rail adapted for mounting a roll-up truck bed cover to said side wall of the truck bed, a first front end part configured to be assembled to a free rear end of the coupling rail in lengthwise extension of said coupling rail, which first front end part has at least one rainwater inlet adapted for alignment with at least one rainwater drain channel of the coupling rail, a first rear end part opposite the first front end part, and at least one rainwater diverting channel and/or chamber extending lengthwise of the mounting part from the at least one rainwater inlet towards the first rear end part, whereby the rear corner element guides rainwater that gathers in the coupling rail from above and from the top face of the truck bed cover out along a rear end wall of the truck bed.

The truck bed covers particularly intended for use with the rear corner element of the present invention are of the roll-up or retractable kind, wherein the covers are composed of a plurality of pivotably connected slats, e.g. the rigid slat disclosed in the applicant's co-pending Danish patent application no. PA 2019 70310.

Within the context of the present invention the term "rainwater" should not be construed as limiting. Rainwater constitutes the majority of water to be diverted and drained along the exterior surface at the rear end of the truck, however the rear corner element can divert any kind of water and liquids, including melt water from snow on top of the truck bed cover.

Within the context of the present invention the term "truck" should not be construed as limited to a particular kind of vehicle. The term "truck" is used for any vehicle designed to transport cargo and having an open truck bed, tray or carrier body to be closed by a roll-up cover, including but not limited to large, medium and small trucks, including pick-ups, SUVs, utes, and trailers for other kinds of vehicles.

In order to mount the rear corner element the base mounting part is simply arranged on top of the side wall of the truck bed. The coupling rail is arranged on top of said side wall in extension of the rear corner element already, which coupling rail serves to mount the truck bed cover in reciprocating manner above the free opening of the truck bed, e.g. as described in relation to the truck bed cover and drive system disclosed in the applicant's international patent application no. PCT/DK2019/050125.

The rear corner element guides the rainwater that gathers in the coupling rail from above and from the top face of the slats of the truck bed cover out along the rear end wall of the truck.

For example water that gathers on top of the array of slats assembled of slats, defined in the applicant's co-pending Danish patent application no. PA 2019 70310, can run into the coupling rail via a drainage track across such a slat in proximity of the free end of said slat, and pass over the exterior surface of the rear end wall of the truck when leaving the first rear end part of the rear corner element as well, and without any drain holes having been drilled in the rear end wall or side wall of the truck bed.

Some truck beds may also utilize drain tubes to divert water from different locations without drain holes into one or more rainwater drain channels of the coupling rail and then further into the rear corner element, optionally pump such water up into the rainwater drain channels of the coupling rail.

It is emphasized that the rear corner element of the present invention cannot be used together with truck bed covers that are mounted to slide in coupling rails mounted inside the truck bed below the free edge of the truck bed side wall.

Both rear corners of the truck bed may be fitted with the rear corner element of the present invention.

The first front end part can be assembled to a free rear end of the coupling rail, e.g. by means of screws to an end wall or end frame at said free rear end of the coupling rail, to arrange the mounting part in lengthwise extension of said coupling rail so that said at least one rainwater inlet is put in liquid communication with the at least one rainwater drain channel of the coupling rail. The screws make the rear corner element detachably secured to the coupling rail whereby the rear corner element can be secured to any length of coupling rail to match any length of truck bed. Once the coupling rail has been cut to appropriate length, taking in consideration the length of the rear corner element, the overall length of coupling rail plus rear corner element arranges the rear corner element to rest partly on the side wall of the truck bed and partly on the rear wall of the truck bed to allow rainwater to drain along the surface of said rear end wall. A detachable rear corner element thus has a versatile use and allows easy customizing and mounting of truck bed covers. A further advantage is that if e.g. the drain channel or chamber becomes obstructed, or in case of rear end collision damages, often only the rear corner element needs to be dismantled, cleaned and/or replaced, and neither drain holes nor mounting holes needs to be drilled in the truck.

Although it is possible and less preferred the rear corner element of the present invention need not be mechanically secured, such as screwed, to the walls of the truck bed. It may simply rests on the upper edges of the walls of the truck bed in secured extension of the coupling rail. Optionally a rubber sealing strip, or similar sealing means are disposed between the upper surface of the truck bed and the lower surface of the rear corner element to close and seal a gap there between.

In an alternative embodiment the rear corner element is permanently fixed or integral with the coupling rail, however this embodiment might be much more expensive to manufacture and does only fit one length of truck bed cover.

The cover part provides the rear corner element with a perfect termination and appearance, and the cover part also contributes to keep the slat array of the truck bed cover from being pulled out of their respective guide grooves of the opposite coupling rails. Rainwater can easily escape between the opposite first rear end part of the mounting part and the second rear end part of the cover part due to a space or gap between the free edges of said first rear end part and said second rear end part. The space or gap can be achieved e.g. by the cover part being longer than the mounting part or by the cover part being vertically spaced from the mounting part.

The mounting part and the cover part may advantageously be detachably connected to each other, e.g. to facilitate inspection of the mounting part, and for easy slidingly removal or slidingly insertion of the truck bed cover into the coupling rails, e.g. for maintenance or replacement of the truck bed cover. Once the cover part is assembled to the mounting part the cover part serves as an end stop that retains the truck bed cover slidingly arranged in the opposite coupling rails between the tailgate and the driver's cab.

In a particular elegant design, the height of the mounting part decreases from the first front end part to the first rear end part.

The cover part may have a roof, a second front end part and an opposite second rear end part, which parts preferably is shaped and dimensioned to follow a smooth curvature to cover the mounting part to provide a rear corner element detachably assembled of two separate parts and having a rounded appearance that terminates the rear end of the rear corner of the truck bed. Preferably the height of the cover part decreases from the second front end part to the second rear end part in substantially same manner as the overall height of the mounting part decreases from the first front end part to the first rear end part.

The cover part may preferably be longer than the base mounting part this way delimiting an outlet for drain and rainwater between a free rear end of the first rear end part and a free rear end the second rear end part. The outlet may e.g. be configured as one slot or gap between the mounting part and the cover part, or more slots or gaps, following the curvature of the free opposite edges of the first rear end part and the second rear end part. Such slot(s) or gap(s) can be provided by said free edges having slightly different radii of curvatures at least on an angular section of said edges.

The rear corner element may include one or more coupling components for coupling the mounting part to the cover part and aligning said mounting part and said cover part properly in relation to each other and in relation to the coupling rail.

For the purposes of detachably coupling the mounting part and the cover part together the first front end part of the mounting part may have first coupling means for end-to-end coupling to second coupling means on the second front end part of the cover part.

In order to further align the mounting part and the cover part and prevent unintentionally axial displacement during assembling, and in case of influences by external unintended forces, e.g. when the truck bed cover rolls, the base mounting part may have a male coupling member, e.g. a male snap coupling member, and the roof have a female snap member, e.g. a female snap coupling member, or vice versa. The engaged coupling members keep the cover part in covering position coupled to the mounting part. The male coupling member, such as a lengthwise extending tubular member or rod, may be laterally resilient, spring-biased or tensioned to flex laterally in and out of the female coupling member, such as a lengthwise extending tubular member, an opening or a hole.

Yet an optional coupling means can be achieved by the base mounting part having a first edge coupling means and the roof having a second edge coupling means to terminate the edge areas of said cover part and said mounting part, preferably except at the majority of the first and second rear end parts where the rainwater drains via the rainwater outlet. Such edge coupling means can be used to couple the mounting part and the cover part together along free edges, or be used for retaining a gasket or other seal means.

In an advantageous embodiment of the rear corner element the base mounting part may include an elongate, axially extending, exterior section configured to rest on top of the side wall of the truck bed, and an elongate, axially extending, interior section extending laterally from the elongate, axially extending, exterior section in order to protrude inside the truck bed.

At least one rainwater diverting channel or chamber may be provided in the elongate, axially extending, exterior section.

A bottom face of the rear corner element may have a protruding pulley wheel bearing for supported suspension of the drive system for the truck bed cover. The pulley wheel bearing may be provided below the elongate, axially extending, interior section and retracted from the second rear end part, a part of which rest on the rear wall of the truck bed, and so that an edge section of the first rear end part of the mounting part can rest on top of the rear corner of the truck bed.

The present invention also relates to a truck bed cover provided with the rear corner element described above.

BRIEF DESCRIPTION OF THE DRAWINGS

The invention will now be explained in further details with references to the drawing in which FIG. 15a is a perspective view from below inside the cover part, FIG. 15b shows the same from the second front end that faces away from the tail gate of the truck bed when the rear corner element is mounted to the truck bed, FIG. 15c shows the same but in an inclined perspective view from below the cover part.

DETAILED DESCRIPTION OF THE INVENTION

Below the rear corner element is described in relation to a roll-up truck bed cover for a pickup having a cargo space between the driver's cab and a tailgate. The cargo space is delimited by the truck bed, which is covered by a roll-up truck bed cover of directly or indirectly connected rigid slats with or without drainage tracks at the end of said rigid slats. The rear corner element can however be used for other kinds of truck bed covers, such as soft covers, including fabric covers, provided the coupling rails are arranged on top of the side walls of the truck bed. The preferred coupling rails are mounted on top of the side wall of the truck bed, preferably using detachable clamps so that no holes need to be drilled in the truck bed walls.

Although just embodiments of right rear corner elements are discussed and described below, and shown in the figures, left rear corner elements are also accomplished, and encompassed within the scope of the present invention. A left rear corner element has a mirror-shape of a right rear corner element, but besides its mirror-shape the left rear corner element may be identical to the right rear corner element, which is why the left rear corner element is not discussed separately.

Figure 1:
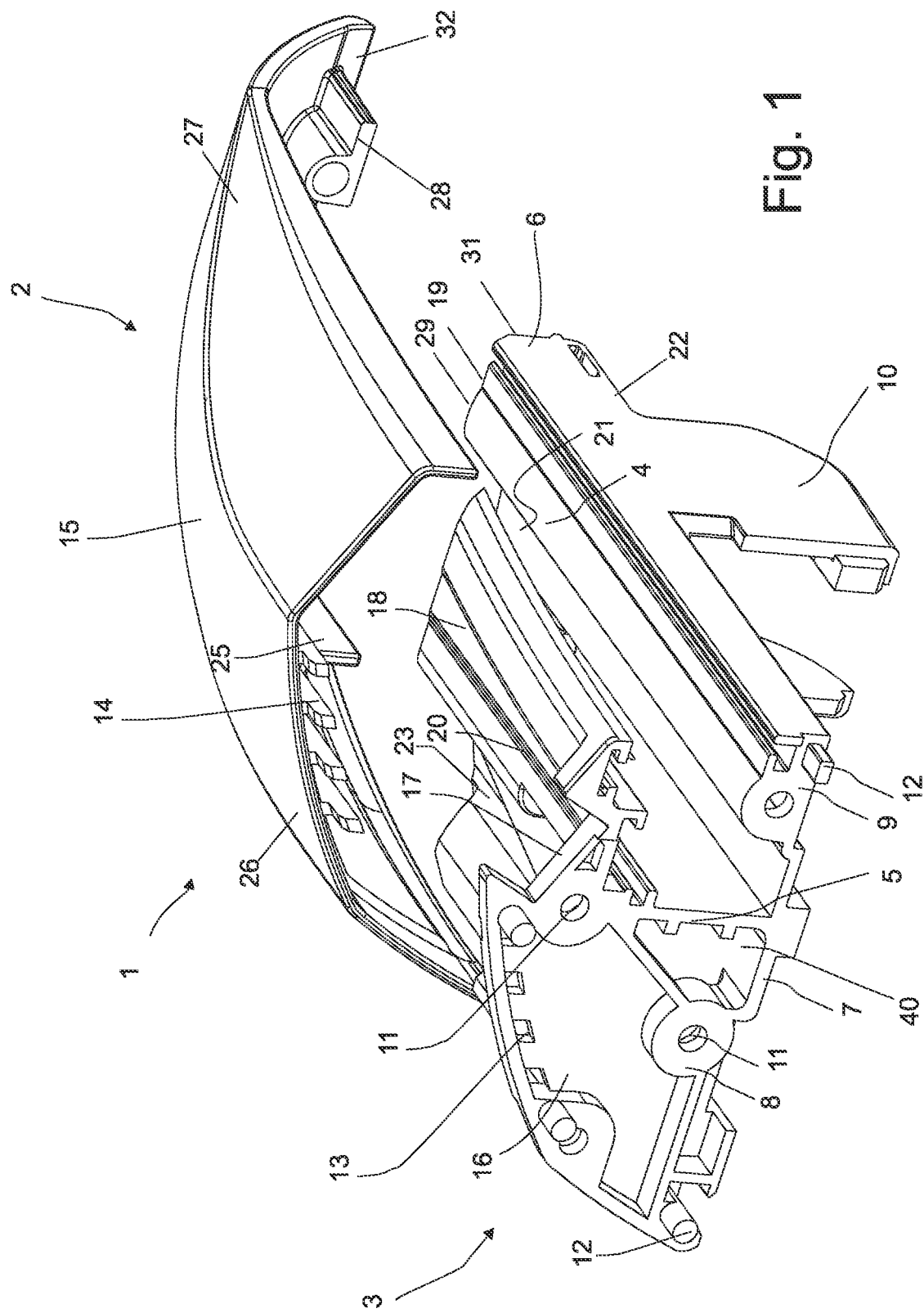
FIG. 1 is a perspective exploded view of a first embodiment of a right rear corner element seen slightly oblique from above, from the first front end part, and from the interior side facing towards the truck bed opening, thus from the interior section of the mounting part.
Figure 2:
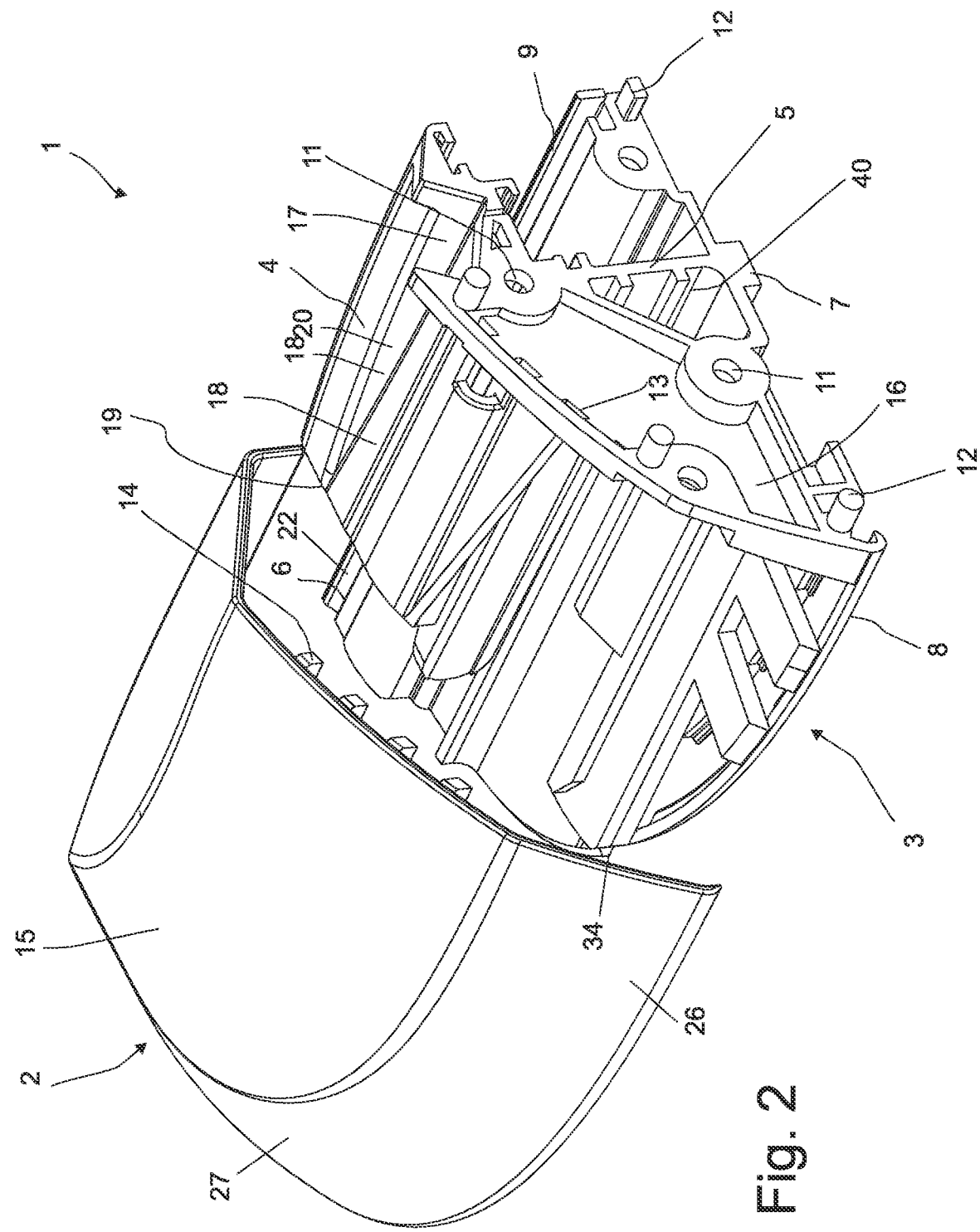
FIG. 2 shows the same but from the free exterior side facing away from the truck bed, thus from the exterior section of the mounting part.
Figure 3:
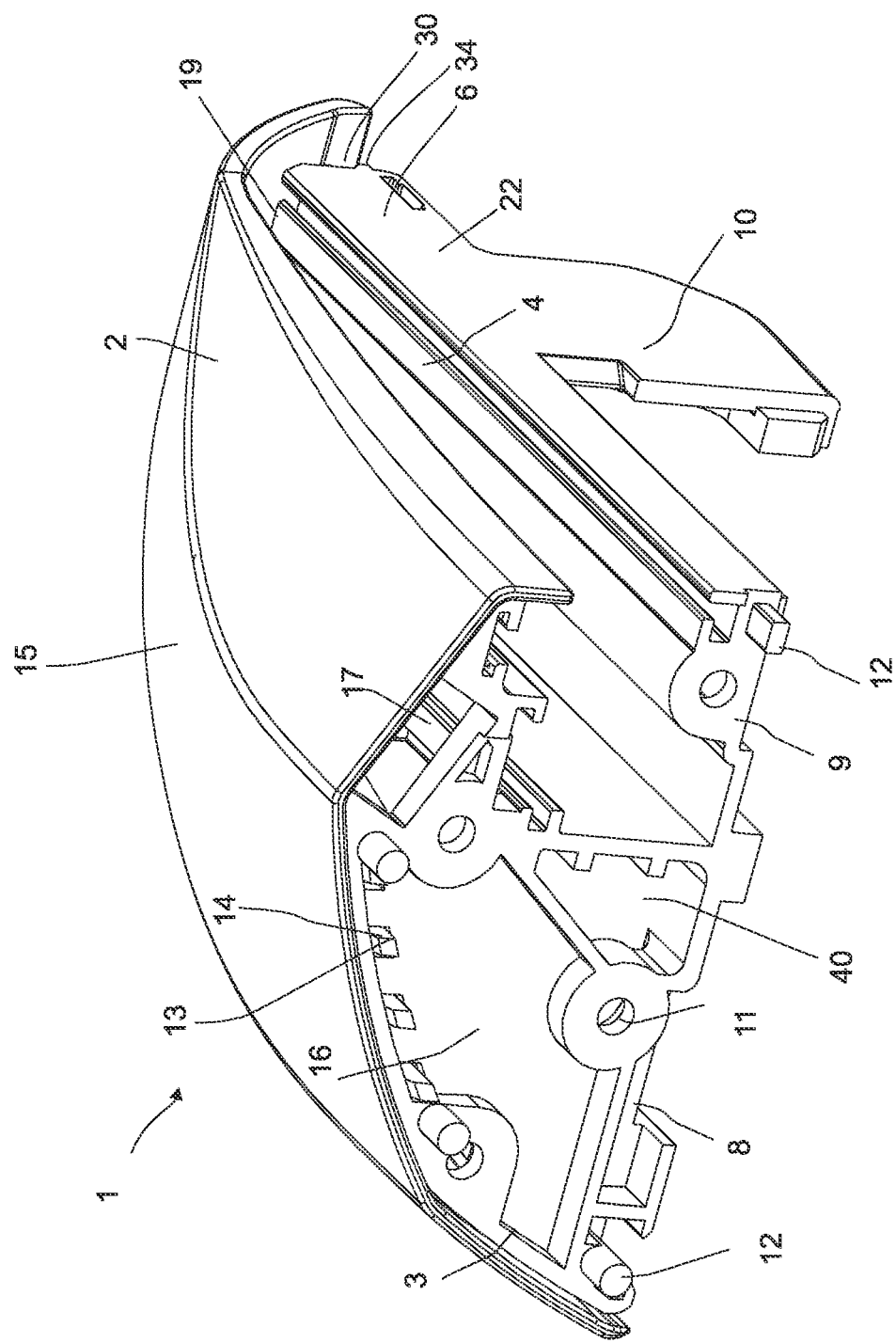
FIG. 3 shows the same as FIG. 1 but in assembled state from above and from the front end parts.

FIGS. 1 and 2 are perspective, exploded views of a first embodiment of a right rear corner element 1 from different angles, and FIG. 3 shows the same in assembled state from the first front end part 5. In the following detailed description, the right rear corner element 1 is referred to as the rear corner element 1.

The rear corner element 1 has a mounting part 3 and a cover part 2, and the structural features and subcomponents of said parts 2,3 will now be described in further details with reference to FIGS. 1-4.

The mounting part 3 is composed of a base mounting part 4, a first front end part 5 and an opposite first rear end part 6. The base mounting part 4 has a substantially flat main base body 7 including an elongate, axially extending, exterior section 8 adapted to rest on top of the rearmost corner of the truck bed (not shown). The axially extending exterior section 8 extends laterally into an elongate, axially extending, interior section 9 that protrudes inside the truck bed and has a pulley wheel bearing 10 protruding substantially perpendicularly from the axially extending interior section 9 down inside said truck bed along and/or adjacent the interior surface of the truck bed side wall (not shown). The pulley wheel bearing 10 suspends the idle pulley wheel of a drive system for the truck bed cover. The drive system can for example be an electric drive system including a timing belt protected by a guide rail connected to or in communication with the pulley wheel bearing 10, as e.g. seen in FIGS. 5, 9 and 16.

The first front end part 5 has three screw holes 11 for securing the first front end part 5 to a free end of a coupling rail (not shown in FIGS. 1-4), and three round and one flat tenon 12 to be joined with corresponding mortises in the free rear end of the coupling rail (not shown). On the side of the first front end part 5 facing away from the coupling rail (not shown), said first front end part 5 has four spaced apart coupling holes 13 along an upper curvature to receive four correspondingly spaced apart protrusions 14 of the cover part 2, which protrusions 14 extend lengthwise along the interior side of the roof 15 of the cover part 2 to also provide structural strength and rigidity to said cover part 2. Except for the coupling holes 13 the exterior section 8 may be end closed by an end wall 16 at the first front end part 5. The number and locations of screw holes, coupling holes, protrusions and tenons, etc., can be other than indicated above, and may depend on the design of the coupling rail. The end wall may be optional. The end wall can also be a separate insertable component, be positioned at the front end of the coupling rail or be integral with the mounting part. Several end walls may also be used to ensure proper coupling of coupling rail to rear corner element, preferably in sealed manner.

The assembling obtained by the features that the first front end part 5 has four spaced apart coupling holes 13 along an upper curvature to receive four correspondingly spaced apart protrusions 14 of the cover part 2 is however optional, and alternative ways of keeping the mounting part 3 and the cover part 2 together are within the scope of the present invention.

A first rainwater inlet 17 is located at the upmost transition between the exterior section 8 and the interior section 9. The first rainwater inlet 17 additionally serves to slide a square not into the coupling rail 35 without having to remove the mounting part, thereby in a simple and fast manner configuring a means for securing an accessory. The upper gutter section 18 curves downwards towards the first rear end part 6 without extending the full length of the main base body 7.

The interior section 9 has an upper gutter section 18 in extension of said first rainwater inlet 17. The upper gutter section 18 curves downwards towards the first rear end part 6 without extending the full length of the main base body 7. Accordingly, the upper gutter section 18 does not reach as far as to the first free rear edge 19 of the first rear end part 6, thereby guiding water down onto the main base body 7 to conduct said rainwater to flow out over the free rear edge 19 down along the rear corner of the truck bed. Thus, the upper gutter section 18 is slightly inclined and is shorter than the total length of the interior section 9, so that rainwater can be guided out of the rear corner element 1. The upper face of the upper gutter section 18 defines a rainwater diverting channel 20 above a rain chamber 21 below the upper gutter section 18, which rain chamber 21 extends lengthwise of the mounting part 3 towards the first rear end part 6.

The rain chamber 21 also provides space and access to secure, such as to screw the coupling rail and the mounting part 3 together. Although the upper gutter section 18 of the present embodiment curves downwards towards the first rear end part 6 without extending the full length of the main base body 7 variations of curvatures and length are within the scope of the present invention. In a particular simple embodiment, the upper gutter section does not curve.

The pulley wheel bearing 10 is retracted from the first free rear edge 19 of the first rear end part 6 thereby providing a free interior end section 22 of the interior section 9. The free interior end section 22 extends laterally into a free exterior end section 23 of the exterior section 8, and in combination said free interior end section 22 and said free exterior end section 23 are the end parts of the mounting part 3 that are placed on top of the side wall of the truck bed at the rear corner. Optionally a resilient sealing strip may be incorporated between the bottom face on the mounting part and the exterior face of the rear truck bed corner to ensure that there is no gap for backflow of rainwater into the truck bed.

Figure 5:
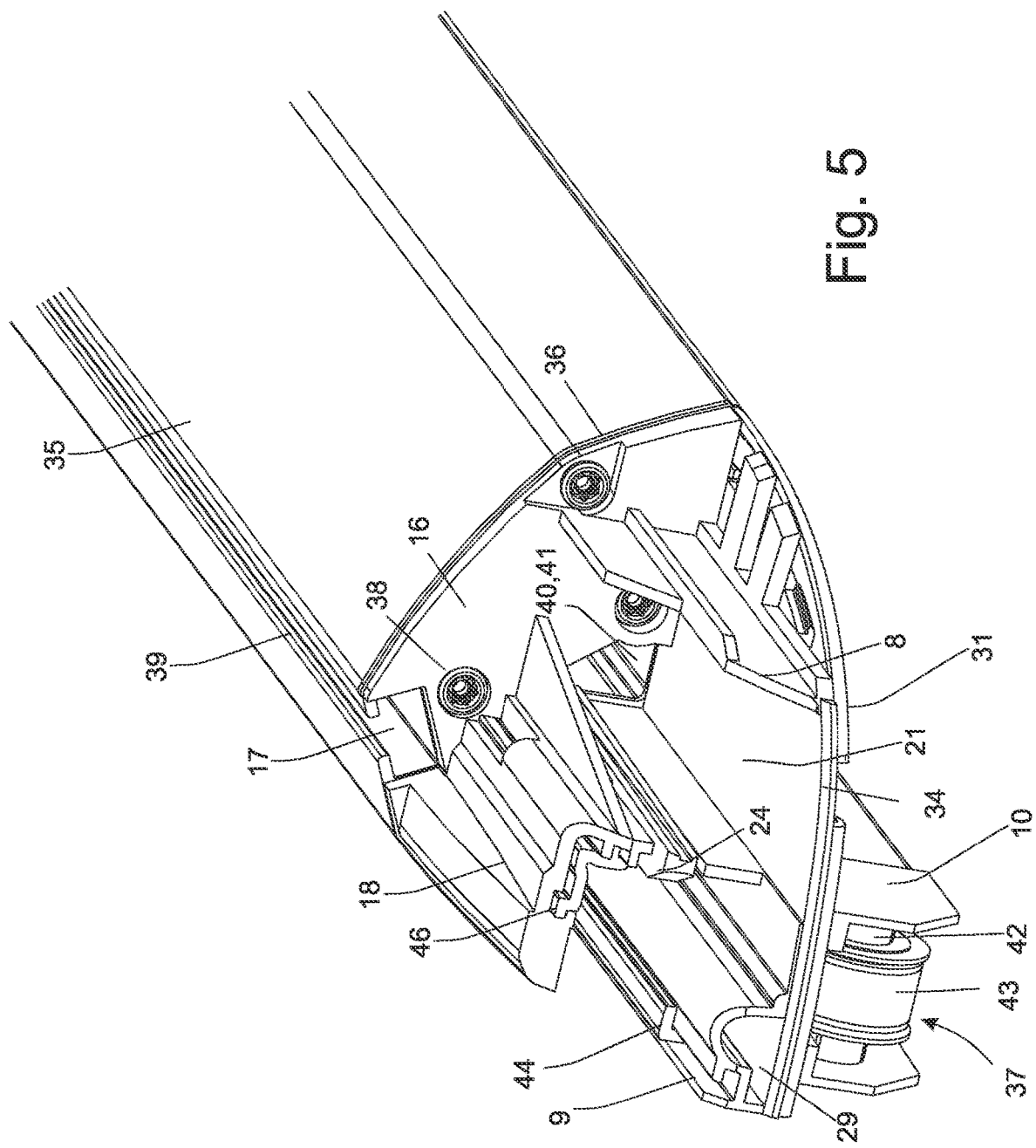
FIG. 5 shows the first embodiment of the rear corner element shown in FIGS. 1-4 mounted in extension of a fragment of a coupling rail provided with a drive system for a truck bed cover, without the cover part, and seen from the exterior section.

The base mounting part 3 has a central male snap coupling member 24, and the roof 15 of the cover part 2 has a complementary central female snap coupling member 25, which is seen best in FIG. 5. When the cover part 2 is moved towards the coupling rail, e.g. axially along the mounting part 3, the male snap coupling member 24 slidingly engages the female snap coupling member 25 to detachably connect the cover part 2 to the mounting part 3.

The roof 15 of the cover part 2 has a second front end part 26 and an opposite second rear end part 27. The second rear end part 27 has an axially protruding plug 28 that fits inside a corresponding plug hole 29 at a first rear end 31 of the interior section 8 for end-to-end securing the cover part 2 to the mounting part 3 opposite the snap coupling members 24,25.

As seen best in FIG. 3 the cover part 2 and the mounting part 3 delimit a gap that serves as an outlet 30 between the free rear edge 19 of the first free rear end 31 of the first rear end part 6 and second free rear end 32 of the second rear end part 27 of said cover part 2.

Figure 4:
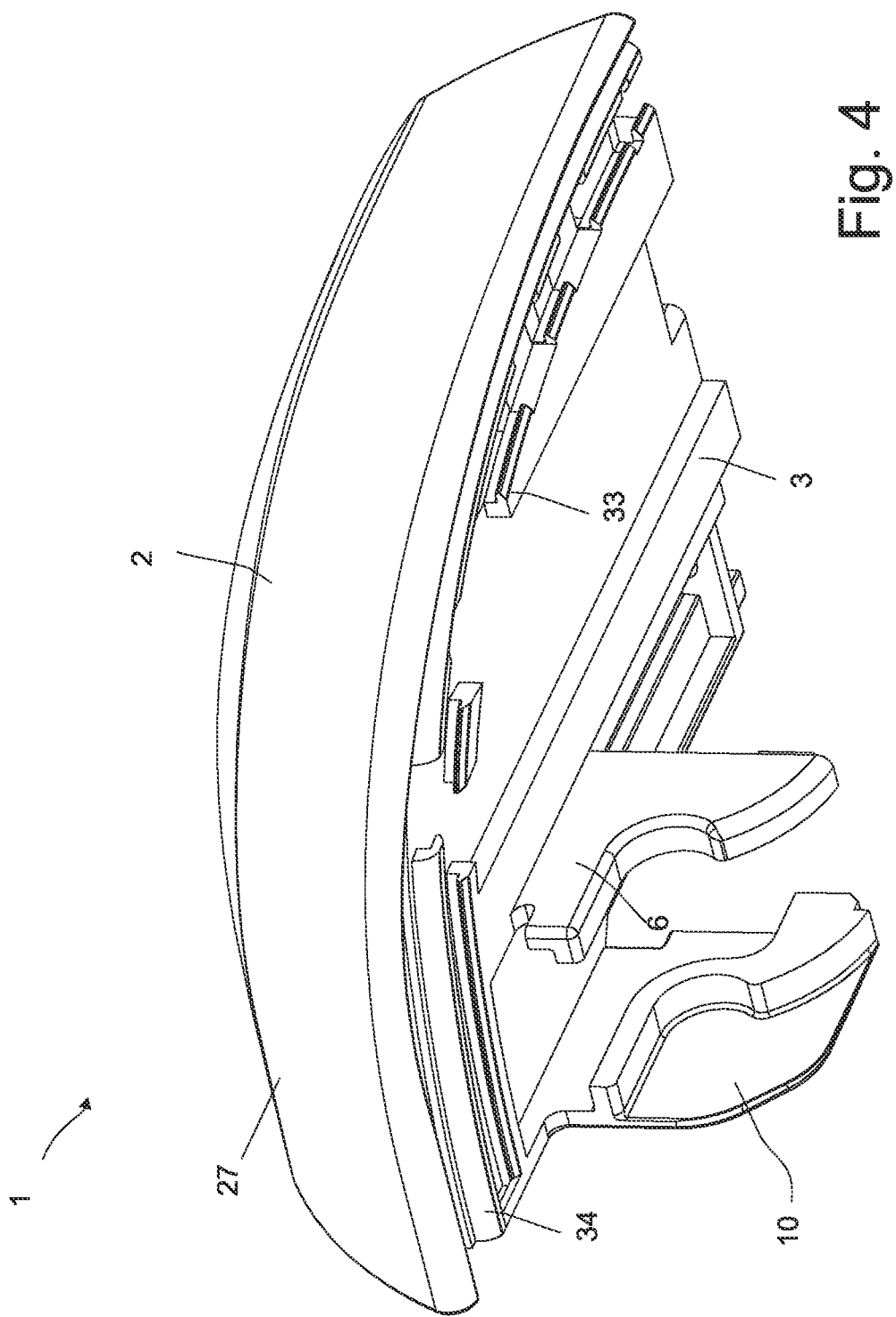
FIG. 4 shows the first embodiment of a rear corner element in assembled state but from below and from the rear end parts.

FIG. 4 shows the rear corner element 1 in assembled state but from below and from the rear end parts 6,27. A first edge coupling means 33 that in use holds a sealing gasket (not shown) in place is provided along at least a part of the circumference of the base mounting part 4 that rests on the wall of the truck bed. Optionally at least a part of the circumference of the base mounting part 4 also has a drip nose 34, which is seen best in FIG. 5.

FIG. 5 shows the rear corner element 1 shown in FIGS. 1-4 mounted in extension of an coupling end wall 36 of a coupling rail 35 provided with a drive system 37 for a truck bed cover (not shown). In FIG. 5 the cover part 2 has been removed. The coupling end wall 36 is secured to the first front end part 5 by means of screws 38 into screw holes 11. The coupling rail 35 has a mounting rail 39 for other accessories, which mounting rail may further serve as a rainwater drain channel. The mounting rail 39 for other accessories is aligned with the first rainwater inlet 17 of the first front end part 5.

Figure 6:
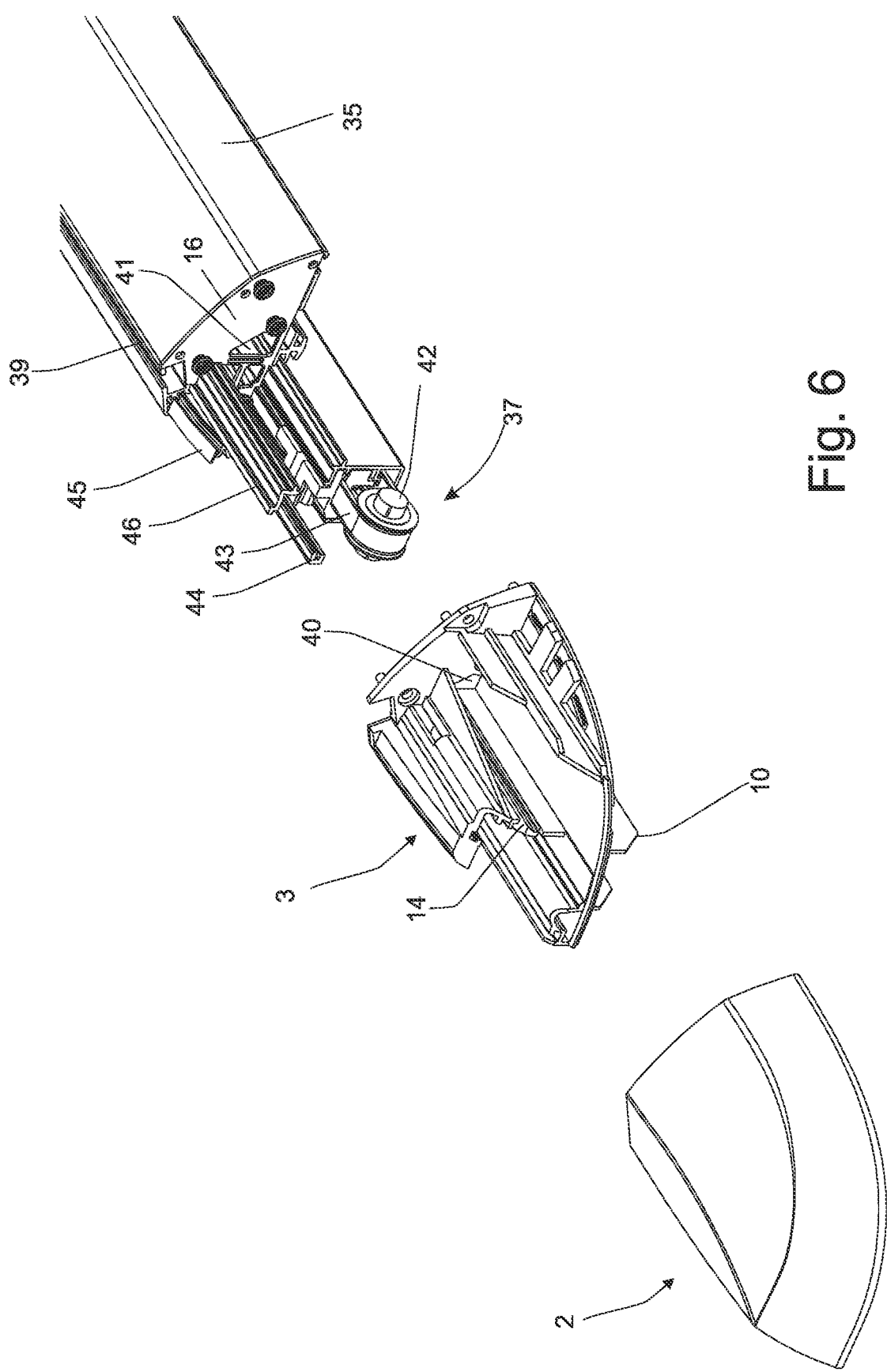
FIG. 6 shows the same in an exploded view seen from above.
Figure 7:
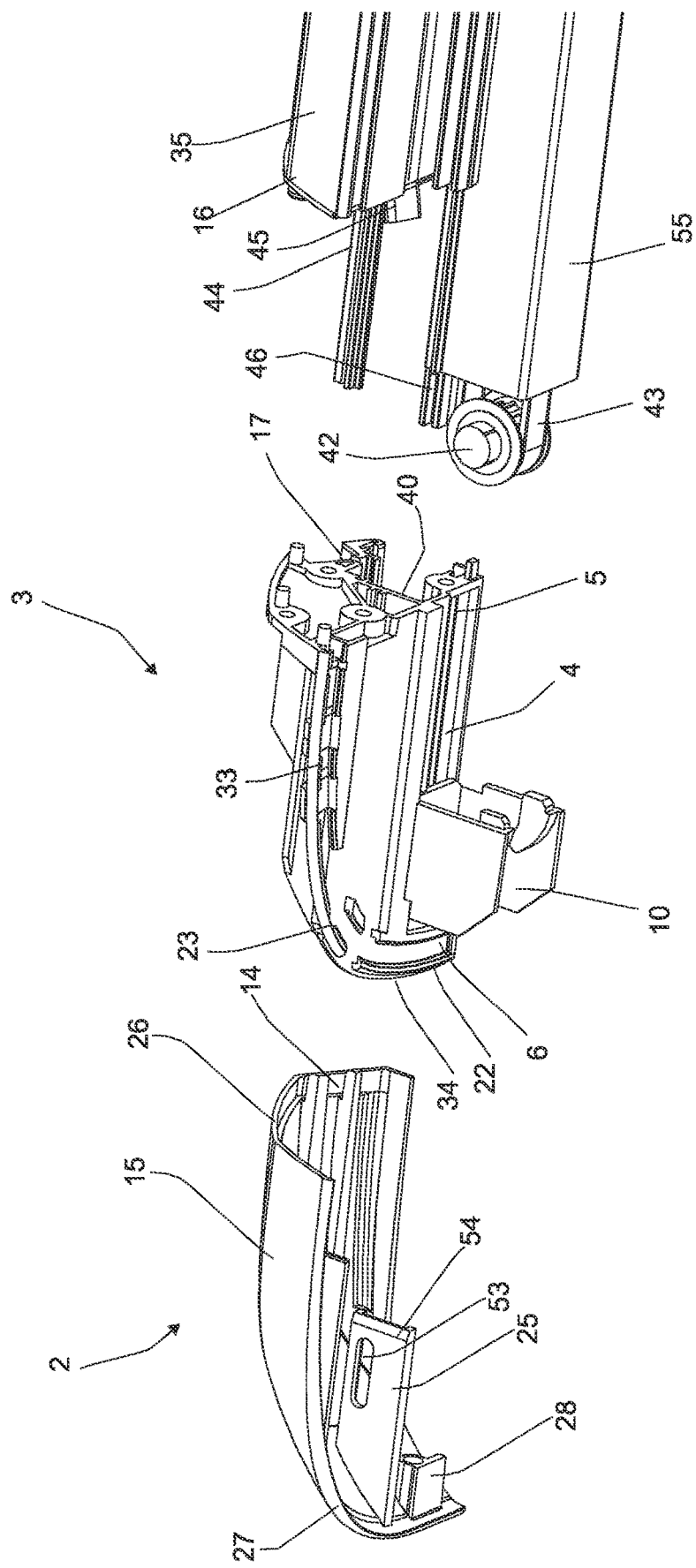
FIG. 7 shows the same in an exploded view seen from below.
Figure 8:
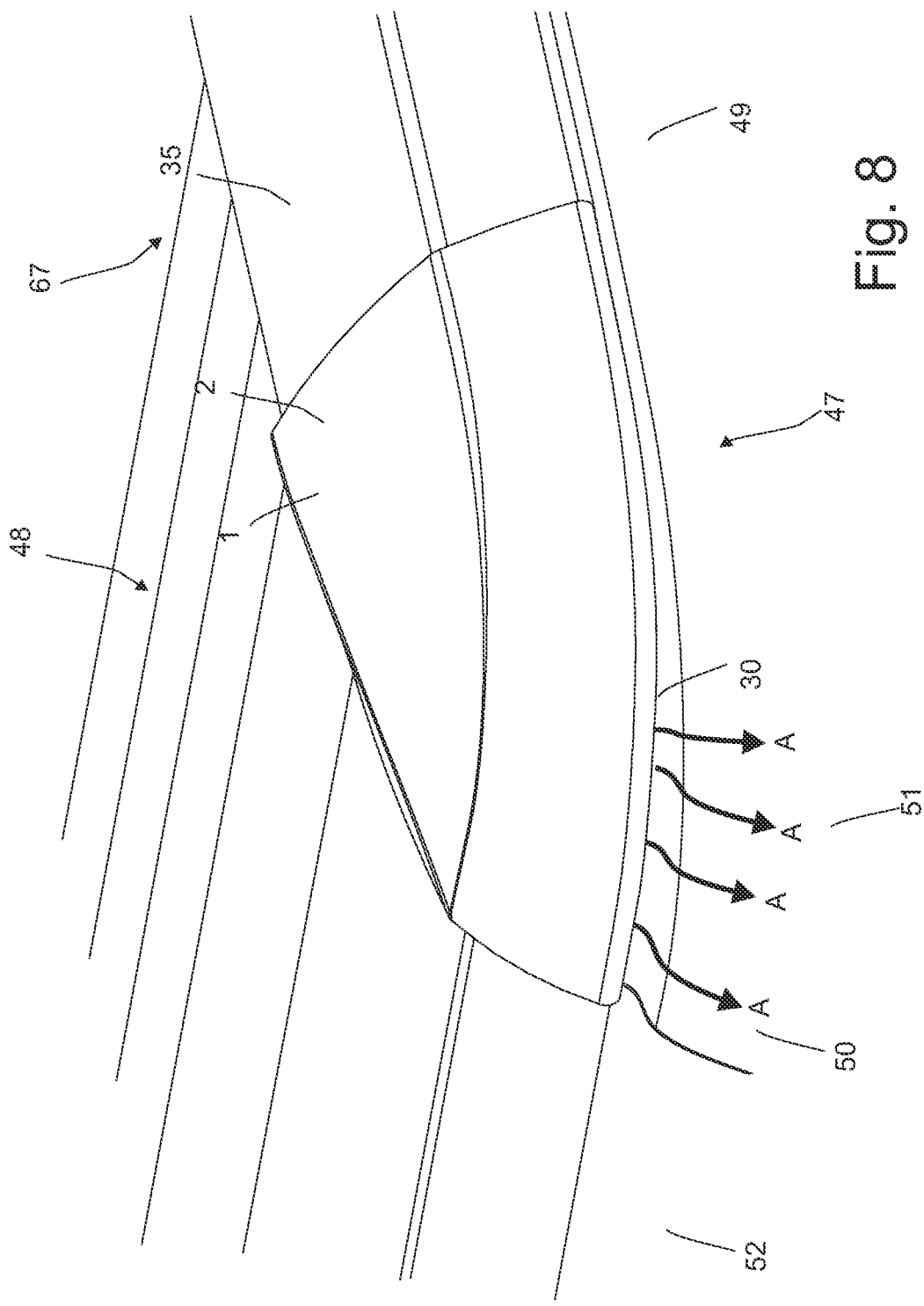
FIG. 8 is a fragmentary perspective view of an end of a truck provided with a truck bed cover implementing the first embodiment of a rear corner element.

FIGS. 6 and 7 show the same in exploded views and illustrate that the pulley wheel bearing 10 does not extend to the drip nose 34 but is retracted therefrom, so that the free interior end section 22 and the free exterior end section 23 can be arranged to rest on top of the rear wall of the rear corner of the truck, as shown in FIG. 8, with the pulley wheel bearing 10 located along a side wall of the truck bed and facing towards the cargo space of the truck bed.

The first front end part 5 has a second rainwater inlet 40 in aligned communication with a coupling rail outlet 41 at the coupling end wall 36 of or for a coupling rail 35, as shown in the fragmentary exploded view of FIG. 6. The second rainwater inlet 40 allows water, e.g. water from drainage tracks crosswise the opposite ends of the slats, to directly enter the rainwater diverting channel chamber 21.

An idle pulley wheel 42 is suspended to the pulley wheel bearing 10 and is driven by a timing belt 43 of the drive system 37 to move the truck bed cover along slide tracks (not shown) of the coupling rail 35.

Slide strips or slide tracks 44,46 extend in channels of the coupling rail 35 and into the rear corner element 1 to reduce friction and avoid metal on metal contact of slat and coupling rail.

Sealing strip 45 extends in a channel of the coupling rail 35 and into the rear corner element 1 to avoid back flow and routing water and moisture another way than out via the outlet 30.

FIG. 8 is a fragmentary, perspective view of a rear corner end of a truck 47 provided with a truck bed cover 48 implementing the rear corner element 1. The truck 47 has a side wall 49 that continues into a rear wall 50 via a rear corner 51 adjacent the tailgate 52. The rear corner element 1 is secured in extension of the coupling rail 35, which coupling rail 35 is clamped to the side wall 49, whereby the rear corner element 1 rests detachably on top of the rear corner 51 of the truck 47 so that the outlet 30 is arranged to divert water along the rear corner 51 and/or the rear wall 50, as indicated by fat arrows A.

Figure 9:
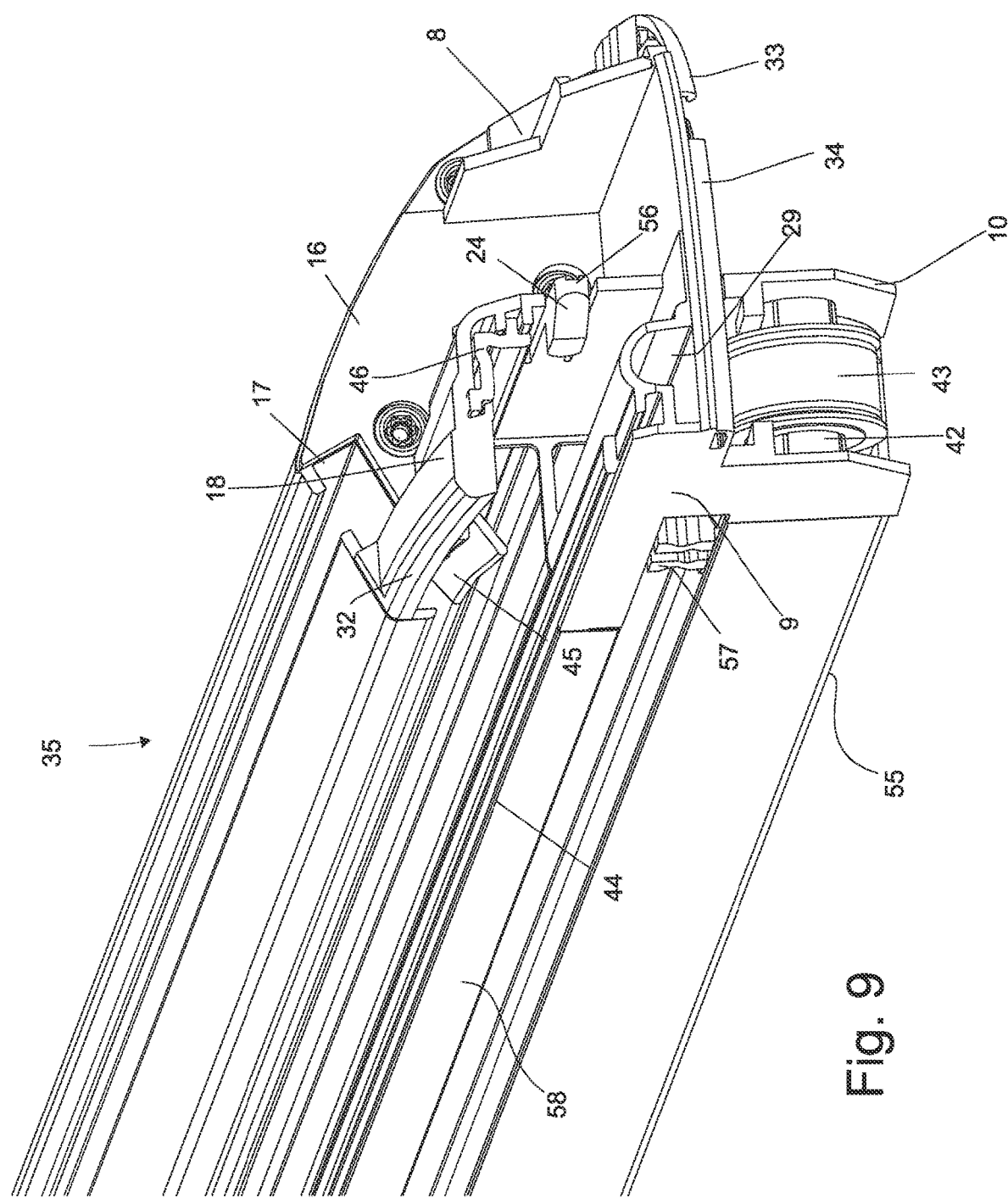
FIG. 9 shows the same as FIG. 5 but from the end and from the interior section.

FIG. 9 shows the rear corner element 1 from the rear end parts 6,27 and from the interior section 9. The central male snap coupling member 24 protrudes laterally below the upper gutter section 18 to laterally and flexible and/or resiliently engage the opening 53 of the female snap coupling member 25 of the cover part 2, which female snap coupling member 25 is seen best in FIG. 7. The upright web 54 of the female snap coupling member 25 serves as a guide surface for the male snap coupling member 24 until said male snap coupling member 24 clicks inside the opening 53 to engage, to achieve the assembled state of the rear corner element 1. The male snap coupling member 24 has a tapered free tip 56 for improved guidance and increasingly biased contact with the upright web 54 when the cover part 2 is moved towards the coupling rail 35 on top of the mounting part 3.

The timing belt 43 is protectively held inside a guide rail 55 and being connected to the coupling rail 35 below said coupling rail 35 so that a timing belt tensioner 57 is accessible to engage the truck bed cover 48 to reciprocate said truck bed cover 48 along a slide track 58, e.g. by means of a connector on a rear profile 59 at the rear end of the array of slats 60, as described in the applicant's international patent application no. PCT/DK2019/050125.

Figure 10:
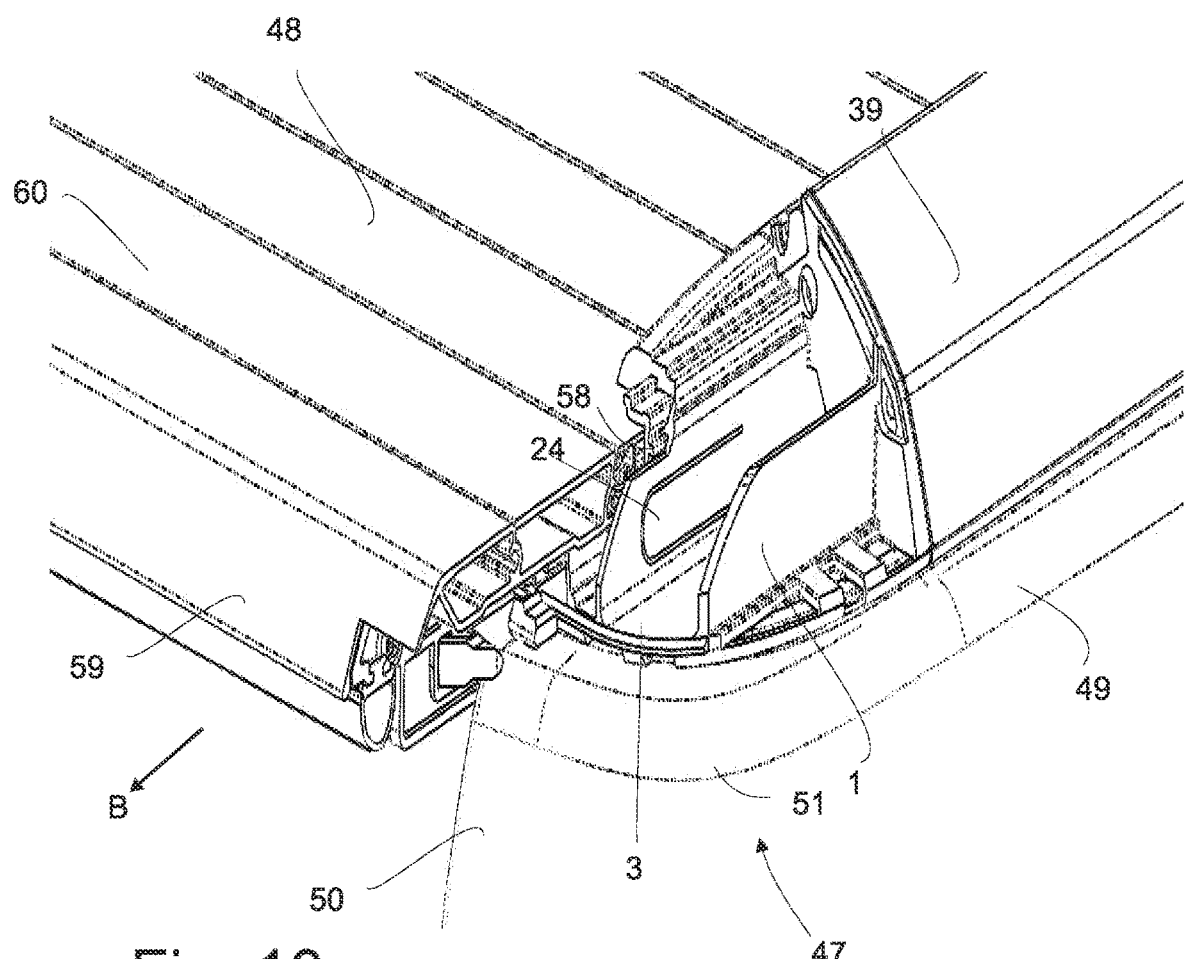
FIG. 10 shows a truck bed cover being removed via the first embodiment of a rear corner element.

In the view of FIG. 10 the cover part 2 has been disengaged the mounting part 3 and the truck bed cover 48 is being removed via the rear corner element 1 by the truck bed cover 48 being disconnected the drive system and then pulling the truck bed cover 48 out of the slide tracks 58 of the opposite coupling rails 35 in the direction indicated by arrow B.

Figure 11:
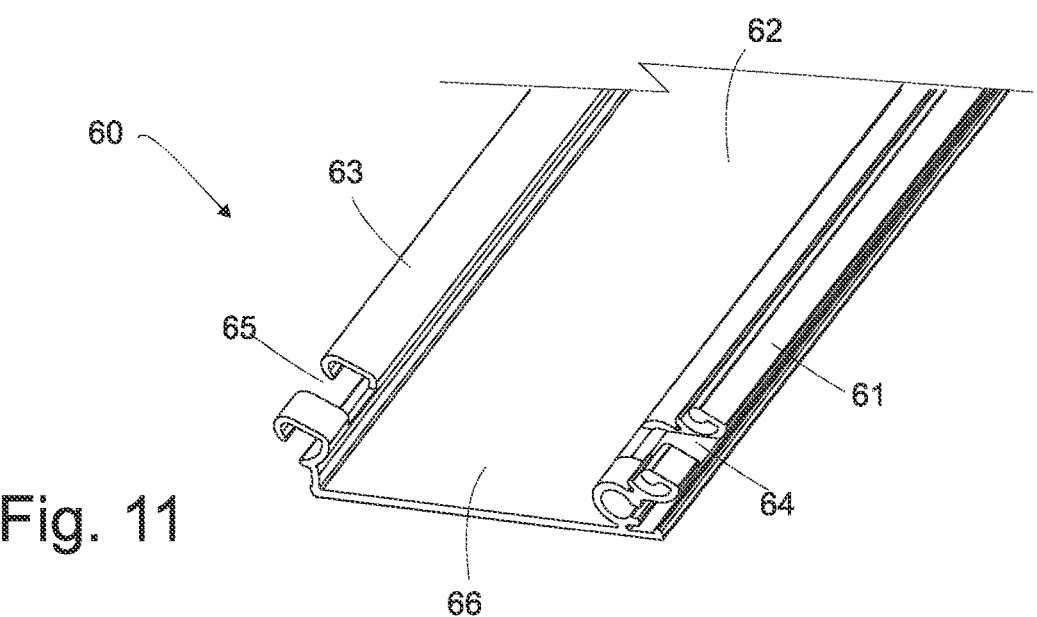
FIG. 11 shows an end fragment of a slat having drainage tracks.

A fragment of the improved slat 60 of PCT/DK2019/050125 is shown in FIG. 11 from below. The slat 60 has a first hinge member 61 which via a flat main slat body 62 extends into a second hinge member 63. Respective drainage tracks 64,65 are cut crosswise said hinge members 61,63 close to the slat end 66 of the slat 60, which slat end 66 is inserted in the slide track 58 of the coupling rail 35. The drainage tracks 64,65 guide rainwater to pass into a drain channel of the coupling rail 35 so that rainwater can flow out over the exterior face of the rear corner 51 of the truck 47 via the rear corner element 1.

As shown in FIGS. 8-10 an array of slats 60 combine together with the rear profile 59 into the truck bed cover 48 that can be rolled up to uncover the cargo opening (not shown) of the truck bed 67, and rolled out again to cover said cargo opening.

Figure 12:
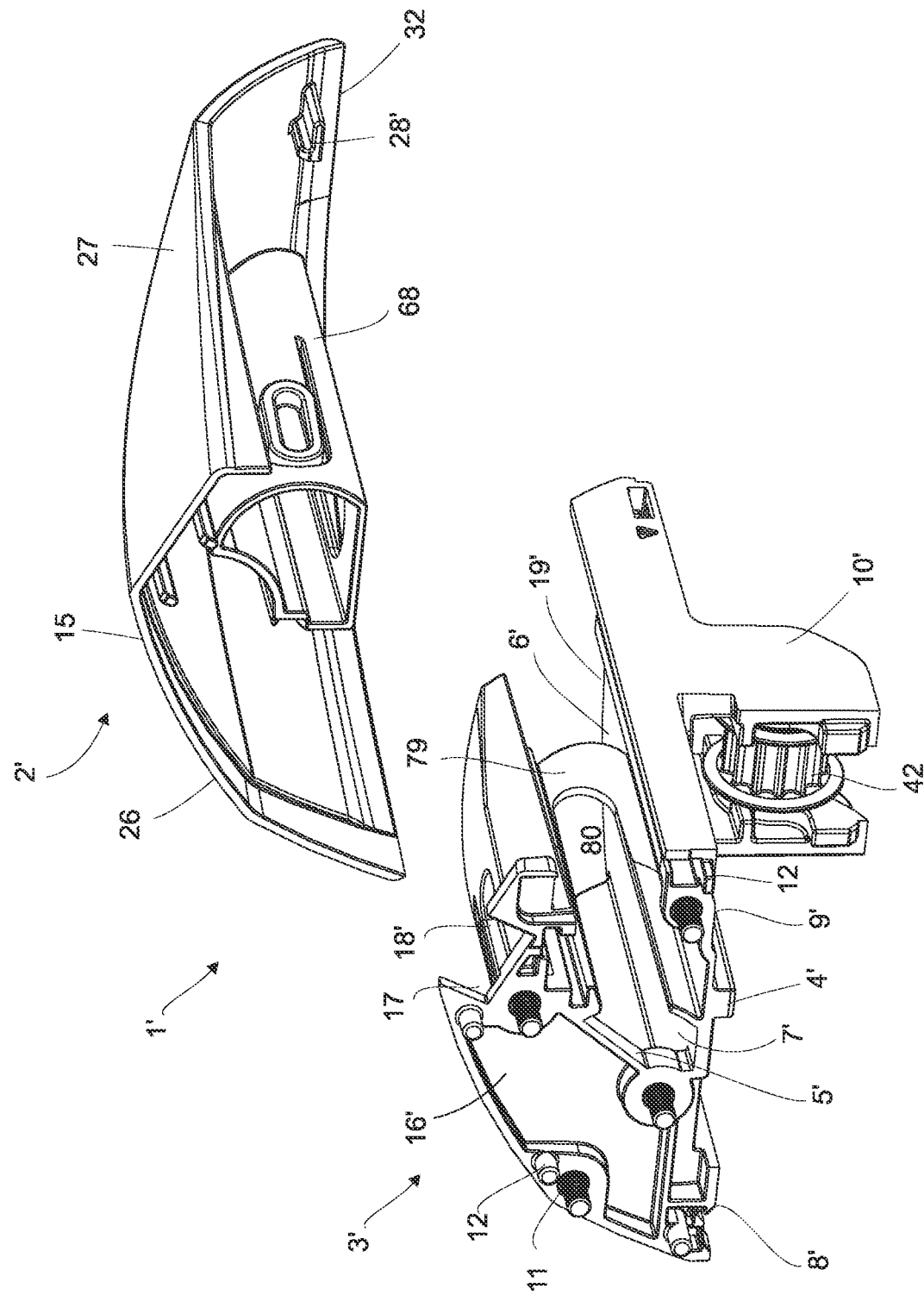
FIG. 12 shows in perspective, a second embodiment of a rear corner element in assembled state from the front ends, and where the rear corner element is aligned with an end wall of a coupling rail for a roll-up truck bed cover.

FIG. 12 shows in perspective, a second embodiment of a rear corner element 1' in dissembled state, and to be aligned with a coupling end wall 36' of a coupling rail 35 for a roll-up truck bed cover 48 in a manner similar to the first embodiment of a rear corner element 1, as shown in FIG. 6.

Preferably the coupling end wall 36' is a gasket to keep water from dripping into the truck bed through the connection between the rear corner element 1' and the coupling rail 35.

FIGS. 13, 14a, 14b, 15a, 15b and 15c are different perspective views of the second embodiment of the rear corner element 1' of FIG. 12, and the main components for rear corner element 1' are seen in different angular orientations.

The second embodiment of a rear corner element 1' corresponds substantially to the first embodiment of a rear corner element 1.

Therefore FIGS. 12-15c are described in common below and for like parts same reference numerals are used. Similar parts are indicated by same reference numeral with addition of apostrophe.

The rear corner element 1' has a mounting part 3' and a cover part 2'. Both serve the same functions as the corresponding components of the first embodiment of a rear corner element 1.

The mounting part 3' has a base mounting part 4', a first front end part 5', and an opposite first rear end part 6'. The substantially flat main base body 7' includes an elongate, axially extending, exterior section 8' that extends laterally into an elongate, axially extending, interior section 9' that has a downwards protruding pulley wheel bearing 10'.

The first front end part 5' has three screw holes 11 for securing the first front end part 5' to a coupling rail 35 via a coupling end wall 36'. The first front end part 5' has an end wall 16' with a second rainwater inlet 40' in aligned communication with a coupling rail outlet 41' of the coupling end wall 36'.

In the present embodiment the coupling end wall 36' is a separate component having appropriate holes and opening for screws and taps to engage and/or receive corresponding components for firm assembling of the coupling rail 35 and the rear corner element 1' end-to-end.

To that aspect the first rainwater inlet 17 serve as a coupling hole for engaging the protrusions 14' to assemble the mounting part 3' and the cover part 2' in appropriate alignment for the rear corner element 1' to be coupled to the coupling rail 35 and then to the top edge of the side wall of the truck bed. Tenons 12 serve to assemble the rear corner element 1' in lengthwise alignment with corresponding mating features of the coupling end wall 36' and/or the end of the coupling rail 35 facing the tail gate. The coupling end wall 36,36' is associated with or configured for the respective embodiments of rear corner elements 1,1' being assembled end-to-end with the coupling rail 35, thus the coupling end wall 36,36' can be a separate insertable component, or be integral with any of the coupling rail 35 or the rear corner element 1'.

The first rainwater inlet 17 is located at the upmost transition between the exterior section 8' and the interior section 9' of the mounting part 3'. The interior section 9' has an upper gutter section 18' in extension of said first rainwater inlet 17. The upper gutter section 18' is shorter than the total length of the interior section 9' and does not reach as far as to the first free rear edge 19' of the first rear end part 6', thereby guiding water down onto the main base body 7' to conduct a flow of water out over the free rear edge 19' and out via the outlet 30.

The upper face of the upper gutter section 18' defines a rainwater diverting area or channel 20' above, and in liquid communication with, a rain chamber 21' below the upper gutter section 18', which rain chamber 21' extends lengthwise of the mounting part 3' a distance towards the first free rear edge 19' of the first rear end part 6'.

The pulley wheel bearing 10' is retracted from the first free rear edge 19' of the first rear end part 6'. The free interior end section 22' of the interior section 9' extends laterally into a free exterior end section 23 of the exterior section 8', and in combination said free interior end section 22' and said free exterior end section 23' are the end parts of the mounting part 3' that are placed on top of the side wall at the rear corner of the truck bed to serve to mount a roll-up truck bed cover in retractable manner.

As seen best in FIGS. 15a, 15b and 15c the roof 15' of the cover part 2' has a second front end part 26' and an opposite second rear end part 27'. The second rear end part 27' has an axially protruding plug 28' of the interior section 8' for end-to-end securing the cover part 2' to the mounting part 3' by coupling the protruding plug 28' into the plug opening 29' at the first rear end part 6' of the mounting part 3'.

The cover part 2' has a male tubular coupling member 68 protruding lengthwise along the roof 15' from the second rear end part 27'. The male tubular coupling member 68 has a lengthwise extending bottom opening 69 opposite the roof 15' to allow water that may arrive from the gutter section 18' of the mounting part 3' to pass out of the tubular male coupling member 68.

The tubular male coupling member 68 has substantially semicircular curved interior second wall section 70 with a flexible lateral male snap coupling member 71. The flexibility of the lateral male snap coupling member 71 is achieved simply by making a U-shaped track 72 in the interior second wall section 70, thereby creating a flexible and deflectable flat-spring member 73 out of the curved interior second wall section 70. The flat-spring member 73 has an engagement knob 75 with a free end 74. The U-shaped track 72 can be made during molding or by subsequent cutting. The engagement knob 73 can likewise be made during molding or added by known attachment processes, such as gluing or heat fusion. The flat-spring member 73 can also be added as a separate component to the outside of the interior second wall section 70.

The curved interior second wall section 70 extends into a curved exterior second wall section 76 that has a coupling track 77 for guided coupling with a coupling rib 78 of a tubular female coupling member 79 of the mounting part 3', which tubular female coupling member 79 is provided lengthwise the exterior section 8' of the mounting part 3' to at least partly receive the tubular male coupling member 68 of the cover part 2' thereby arranging the upper gutter section 18' of the mounting part 3' to extend above the interior section 9' of the mounting part 3'.

The tubular female coupling member 79 has a side opening 80 that flexibly and/or resiliently engage the engagement knob 75 of the male snap coupling member 71 to ensure the detachably interconnection of cover part 2' and mounting part 3' in the assembled state of the rear corner element 1', thus when the tubular male coupling member 68 has been inserted into tubular female coupling member 79.

The tubular female coupling member 79 is tunnel shaped with a tunnel wall 80 having a first wall section 81 arranged at the exterior section 8', and a second wall section 82 arranged substantially at the mid of the flat main base body 7'. The first wall section 81 and the second wall section 82 are connected by a tunnel roof section 83. An exterior area 84 of the tunnel roof section 83 may be located at the exterior section 8'. The exterior area 84 extends laterally into the upper gutter section 18' as part of said gutter section 18'.

Figure 13:
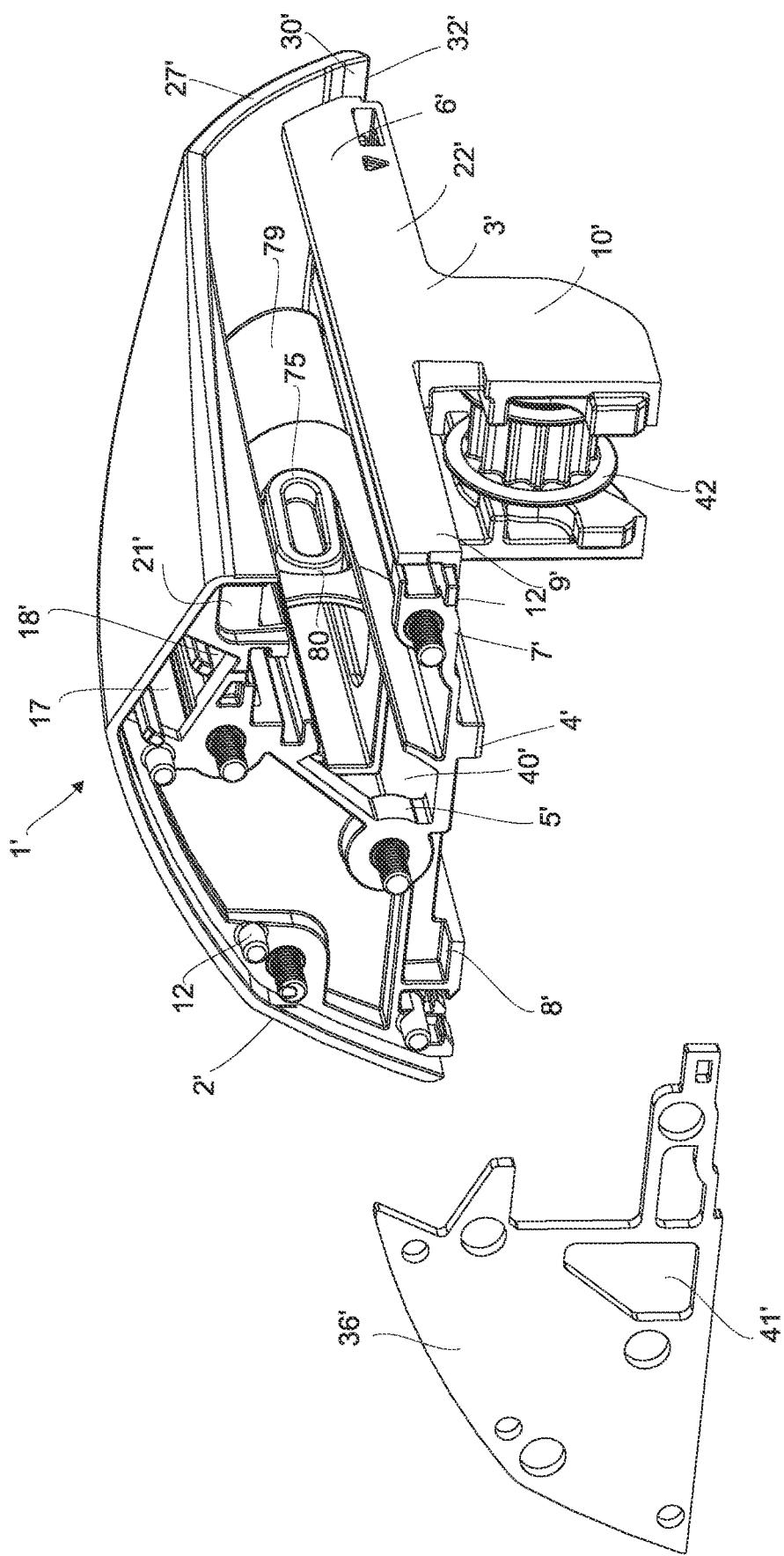
FIG. 13 shows the second embodiment of the rear corner element seen in FIG. 12 in exploded view from the interior side of the interior section.
Figure 14A:
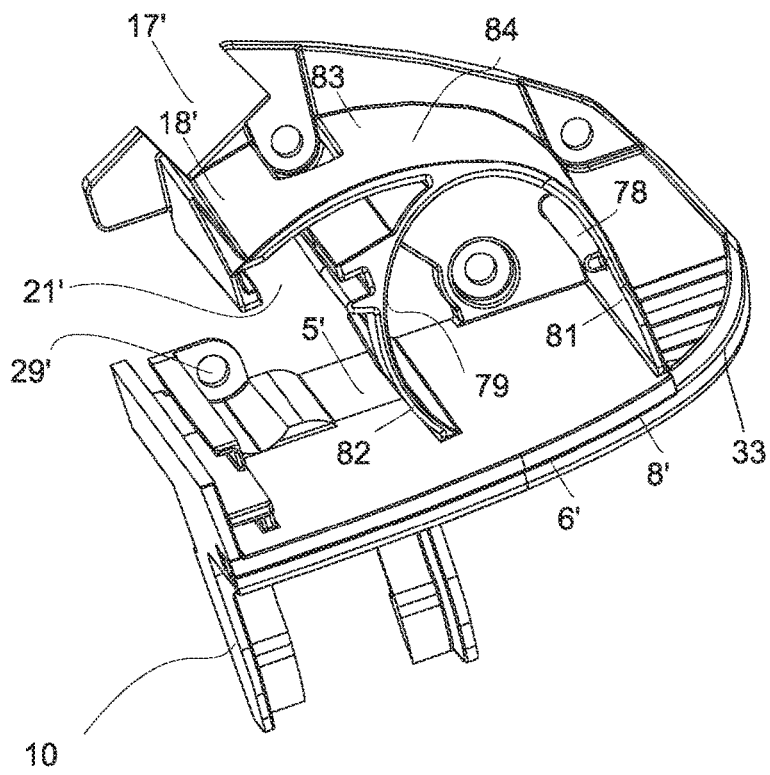
FIG. 14a shows, in perspective, the mounting part from the first rear end that faces the tail gate of the truck bed when the rear corner element is mounted to the truck bed.
Figure 14B:
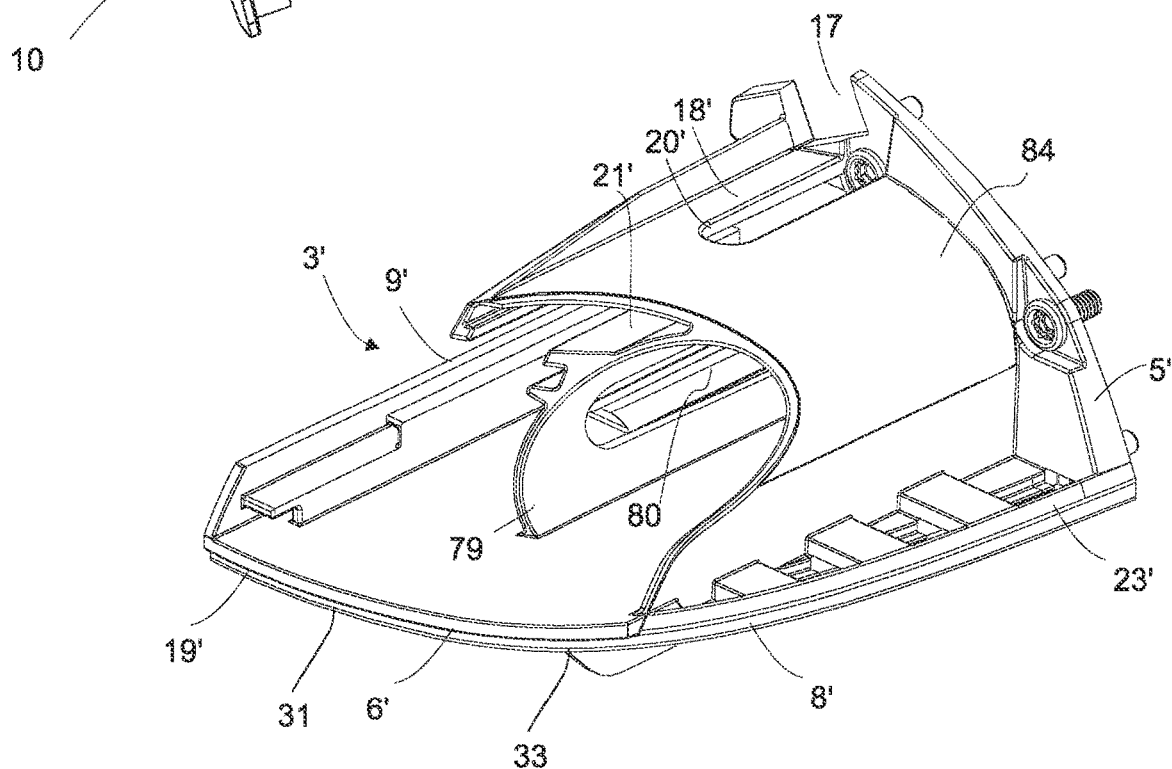
FIG. 14b shows the same from above.

As seen best in FIG. 13 the cover part 2' and the mounting part 3' delimit an outlet 30' between the first rear end part 6' of the mounting part 3' and the second free rear end 32' of the second rear end part 27' of said cover part 2'. The outlet 30' serves for draining water gathering on top of the truck bed cover, water gathering in the rainwater drain channel 39 of the coupling rail 35, and any water that otherwise is transported to the rear corner element 1' by the coupling rail 35.

Figure 16:
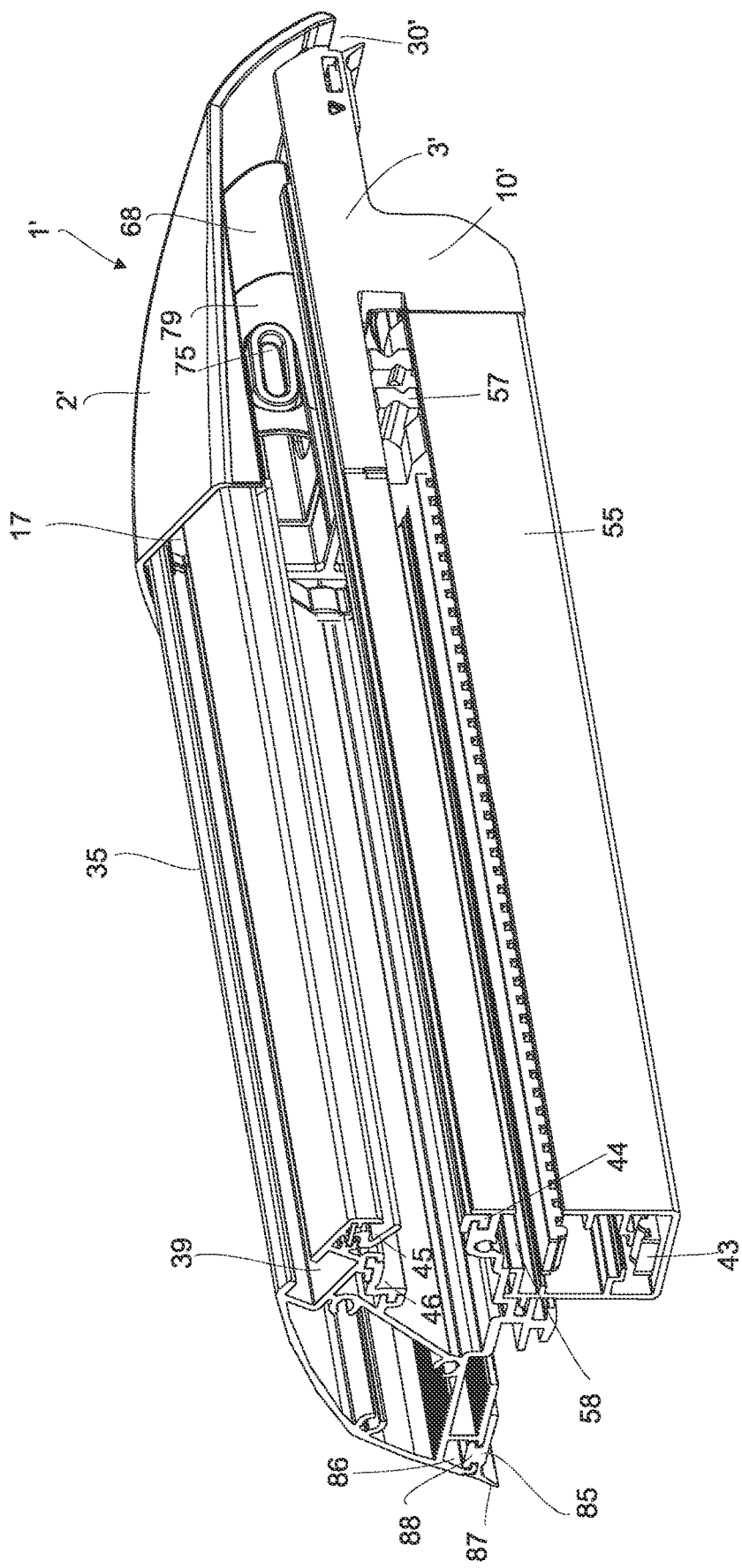
FIG. 16 shows the second embodiment of a rear corner element mounted at a piece of coupling rail for a roll-up truck bed cover, and to a drive system for reciprocating a roll-up truck bed cover.

FIG. 16 shows the second embodiment of a rear corner element 1' mounted at a piece of coupling rail 35 for a roll-up truck bed cover. The view of FIG. 16 corresponds substantially to the view of FIG. 9, but with the difference that the rear corner element 1' is in assembled state.

The timing belt 43 is protectively held inside a guide rail 55 connected to the coupling rail 35 below said coupling rail 35 so that a timing belt tensioner 57 is accessible to laterally engage a connector component of the truck bed cover 48 to reciprocate said truck bed cover 48 along a slide track 58.

A seal means in form of a truck bed sealing strip 85 is arranged in an exterior groove 86 of the coupling rail 35 so that a first truck bed sealing strip part 87 of the truck bed sealing strip 85 is outside the exterior groove 85 and a second truck bed sealing strip part 88 of the truck bed sealing strip 85 is inside the exterior groove 86 for securing of the truck bed sealing strip 85 in said exterior groove 86. The first truck bed sealing strip part 87 serves as a seal between the upper edge of the truck bed wall and the coupling rail 35. The second truck bed sealing strip part 88 is the part of the truck bed sealing strip 85 that may anchor in the exterior groove 86.

The truck bed sealing strip 85 follows the curvature of the upper edge of the truck bed wall, and along the first free rear end 31' of the first rear end part 6', and is secured to the bottom face of flat main base body 7' along said curvature by means of the first edge coupling means 33, also shown in FIG. 7.

The cover part is detachably mounted to the mounting part to provide the rear corner element with a sleek appearance, to protect the components of the mounting part, and to prevent water from entering the mounting part, and prevent water from flowing back into the coupling rail.

The invention claimed is:

1. A rear corner element for a roll-up truck bed cover, wherein the rear corner element has a mounting part and a cover part,
    wherein the mounting part has
        a base mounting part adapted for being secured on top of a rear end of a side wall of the truck bed in elongation of a coupling rail adapted for mounting a roll-up truck bed cover to said side wall of the truck bed,
        a first front end part configured to be assembled to a free rear end of the coupling rail in lengthwise extension of said coupling rail, which first front end part has at least one rainwater inlet adapted for alignment with at least one rainwater drain channel of the coupling rail,
        a first rear end part opposite the first front end part, and
        at least one rainwater diverting channel and/or chamber extending lengthwise of the mounting part from the at least one rainwater inlet towards the first rear end part whereby the rear corner element guides rainwater that gathers in the coupling rail from above and from the top face of the truck bed cover out along a rear end wall of the truck bed.

2. A rear corner element according to claim 1, wherein the mounting part and the cover part are detachably connected to each other.

3. A rear corner element according to claim 1, wherein a height of the mounting part decreases from the first front end part to the first rear end part.

4. A rear corner element according to claim 1, wherein the cover part has a roof, a second front end part and an opposite second rear end part.

5. A rear corner element according to claim 4, wherein the cover part is longer than the base mounting part to delimit an outlet between a free rear end of the first rear end part and a free rear end the opposite second rear end part.

6. A rear corner element according to claim 1, wherein the base mounting part has a length selected to extend over the rear end of the side wall of the truck bed.

7. A rear corner element according to claim 1, wherein the base mounting part includes an elongate, axially extending, exterior section configured to rest on top of a side wall of the truck, and an elongate, axially extending, interior section extending laterally from the elongate, axially extending, exterior section in order to protrude inside the truck bed.

8. A rear corner element according to claim 1, wherein the rear corner element has a protruding pulley wheel bearing.

9. A rear corner element according to claim 1, wherein the rear corner element includes one or more of following characteristics:
- the first front end part of the mounting part has first coupling means for coupling to second coupling means on the second front end part of the cover part; and
- the base mounting part has a male coupling member and the cover part has a female coupling member, or vice versa.

10. A rear corner element according to claim 1, wherein that the base mounting part has a first edge coupling means.

11. A rear corner element according to claim 1, wherein the rear corner element has an end wall with a second rain water inlet.

12. A rear corner element according to claim 1, and a coupling rail wherein the rear corner element is mounted end-to-end to a coupling rail, which coupling rail has a separate or integral coupling end wall with a coupling rail outlet.

13. A truck bed cover including the rear corner element according to claim 1 at both opposite rear corners of the truck bed cover.

* * * * *